United States Patent [19]

Niikura et al.

[11] Patent Number: 4,858,898
[45] Date of Patent: Aug. 22, 1989

[54] ACCUMULATOR

[75] Inventors: Yoshiharu Niikura, Fujisawa; Takeo Fukumura; Chiharu Umetsu, both of Yokohama, all of Japan

[73] Assignee: NHK Spring Co., Ltd., Yokohama, Japan

[21] Appl. No.: 292,377

[22] Filed: Dec. 30, 1988

[30] Foreign Application Priority Data

Jan. 19, 1988 [JP] Japan .................... 63-8924

[51] Int. Cl.$^4$ .......................... F16F 9/43; B60G 17/04
[52] U.S. Cl. .................................. 267/218; 267/64.28
[58] Field of Search ................ 267/218, 64.15, 64.16, 267/64.26, 64.28; 280/707

[56] References Cited

U.S. PATENT DOCUMENTS

| 3,013,920 | 12/1961 | Harris et al. | |
|---|---|---|---|
| 4,614,255 | 9/1986 | Morita et al. | 188/315 |
| 4,720,085 | 1/1988 | Shinbori et al. | 267/64.16 |
| 4,746,106 | 5/1988 | Fukumura | 267/218 |

FOREIGN PATENT DOCUMENTS

| 56-131409 | 10/1981 | Japan . |
| 56-149203 | 11/1981 | Japan . |
| 59-5447 | 2/1984 | Japan . |
| 59-151648 | 8/1984 | Japan . |
| 61-66237 | 5/1986 | Japan . |
| 996768 | 2/1983 | U.S.S.R. . |
| 1239627 | 7/1971 | United Kingdom . |

Primary Examiner—Duane A. Reger
Attorney, Agent, or Firm—Frishauf, Holtz, Goodman & Woodward

[57] ABSTRACT

A rod is inserted in a first cylinder. A first oil chamber is defined by the inner surface of the first cylinder. The rod can be reciprocated with a first stroke. A second cylinder is coupled to the first cylinder by a connecting member. A metal bellows is housed in the second cylinder. A gas chamber is defined by the inner surface of the bellows. A second oil chamber is defined by the outer surface of the bellows and the inner surface of the second cylinder. The bellows contracts with a second stroke corresponding to the first stroke of the rod. The first and second oil chambers communicate with each other via an oil path formed in the connecting member. A valve seat is arranged on an end wall of the second cylinder. A valve body is fixed to the bellows so as to oppose the valve seat. If the bellows expands farther than the second stroke when a gas is supplied into the gas chamber, the valve body is brought into contact with the valve seat. When the valve body and the valve seat are brought into contact with each other, the oil is entrapped in a gap between the inner surface of the second cylinder and the outer surface of the bellows body.

9 Claims, 4 Drawing Sheets

ACCUMULATOR

BACKGROUND OF THE INVENTION

1. Field of the Invention

The present invention relates to an accumulator used in a vehicle, a trailer, hydraulic system and the like and, more particularly, to a hydro-pneumatic accumulator having a cylinder in which a liquid and a high-pressure gas are stored.

2. Description of the Related Art

A suspension apparatus generally used in a vehicle and the like comprises a suspension spring for supporting the weight of the vehicle body and a shock absorber. A coil spring or a leaf spring has been used as the suspension spring. In a hydro-pneumatic suspension apparatus previously developed by the present inventor, however, a bellows is housed in a cylinder, so that the interior of the cylinder is partitioned by the bellows into an oil chamber and a gas chamber.

A gas having a high pressure (8 kg/cm$^2$ or more) is sealed in the gas chamber. When the weight of the vehicle body is loaded, a pressure of the gas is $10 \sim 70$ kgf/cm$^2$ at lower bound and $50 \sim 350$ kgf/cm$^2$ at upper bound. When the gas is supplied into the cylinder, the bellows is axially deflected by the pressure of the gas. In this case, deflection means expansion or contraction of the bellows. In order to prevent deflection of the bellows from exceeding an allowable limit, the present inventor proposed to arrange a stopper at a position where an end face of the bellows can be supported when it is deflected by an amount exceeding a predetermined value. This stopper has a plate-like or cylindrical shape and is arranged at a position opposite to the distal end of the bellows in the cylinder.

It was found, however, that even if axial deflection of the bellows is suppressed within a predetermined limit by the stopper, the bellows is radially deformed when the pressure of a gas is high. Especially, in a case wherein a metal bellows is used, if plastic deformation of the bellows occurs its normal shape cannot be restored again. Hence, a portion subjected to plastic deformation becomes a fatal defect. In addition, in order to incorporate the plate-like or cylindrical stopper in the cylinder, a specific space for housing the stopper must be ensured in the cylinder. Moreover, extra measures must be taken to fix the stopper to the cylinder, and hence the arrangement of the cylinder becomes complicated.

SUMMARY OF THE INVENTION

It is, therefore, an object of the present invention to provide an accumulator in which when a gas having a high pressure is supplied into a gas chamber, deformation of a bellows due to the pressure of the gas can be prevented, and a structure for this operation can be simplified.

In order to achieve the above object, according to the present invention, there is provided an accumulator comprising:

a first hollow cylinder whose inner surface defines a first liquid chamber which is filled with a liquid;

a rod which is inserted in the first cylinder and can be reciprocated in an axial direction of the first cylinder with a first stroke;

connecting means arranged in the first cylinder or the rod, a liquid path communicating with the first liquid chamber being formed in the connecting means;

a second hollow cylinder connected to the first cylinder or the rod by means of the connecting means and having first and second end walls opposing each other;

a bellows housed in the second cylinder, the bellows including a bellows body and an end plate for sealing one end of the bellows body, the other end of the bellows body being fixed to the first end wall of the second cylinder, the bellows body freely expanding and contracting in an axial direction of the second cylinder with a second stroke corresponding to the first stroke of the rod, a gas chamber being defined by an inner surface of the bellows body, a compressed gas being sealed in the gas chamber, a second liquid chamber being defined by an outer surface of the bellows and an inner surface of the second cylinder, and the second liquid chamber communicating with the first liquid chamber via the liquid path of the connecting means;

a gas supply port formed in the second cylinder, the gas supply port being opened when a gas is supplied into the gas chamber, and being sealed upon completion of supply of the gas;

a hydraulic circuit, connected to the first or second liquid chamber, for charging/discharging a liquid into/- from the chambers;

an annular valve seat formed on the second end wall of the second cylinder, the valve seat being arranged at an opening of the liquid path so as to oppose the second liquid chamber; and a valve body which is arranged on a surface of the end plate of the bellows, which opposes the valve seat, in such a manner that when the bellows moves within a range of the second stroke, the valve member does not reach the valve seat, and when the bellows expands farther than the second stroke, the valve body is brought into contact with the valve seat so as to close the liquid path of the connecting means, and the liquid is entrapped in a gap between the inner surface of the second cylinder and an outer surface of the bellows body.

When a gas is supplied into the gas chamber of the above-described accumulator, the liquid chambers are filled with a liquid in advance. In this state, a high-pressure gas is supplied into the gas chamber through the gas port. As the gas is supplied into the gas chamber, the bellows axially deflects. When deflection of the bellows reaches a predetermined value, the valve body is brought into contact with the valve seat to close the liquid path of the connecting means. At the same time, the liquid is entrapped in a gap between the outer surface of the bellows body and the inner surface of the second cylinder.

The gas is kept supplied into the gas chamber after the valve body is brought into contact with the valve seat. As a result, the pressure in the gas chamber is gradually increased. Since the liquid is substantially incompressible, even if a high pressure acts on the bellows, the entire outer surface of the bellows body is uniformly supported by the liquid entrapped in the gap. The valve seat is formed around the opening portion of the liquid path which connects the first and second cylinders to each other. With this arrangement, no specific space or member is required to form the valve seat.

DETAILED DESCRIPTION OF THE PREFERRED EMBODIMENTS

Figure 1:
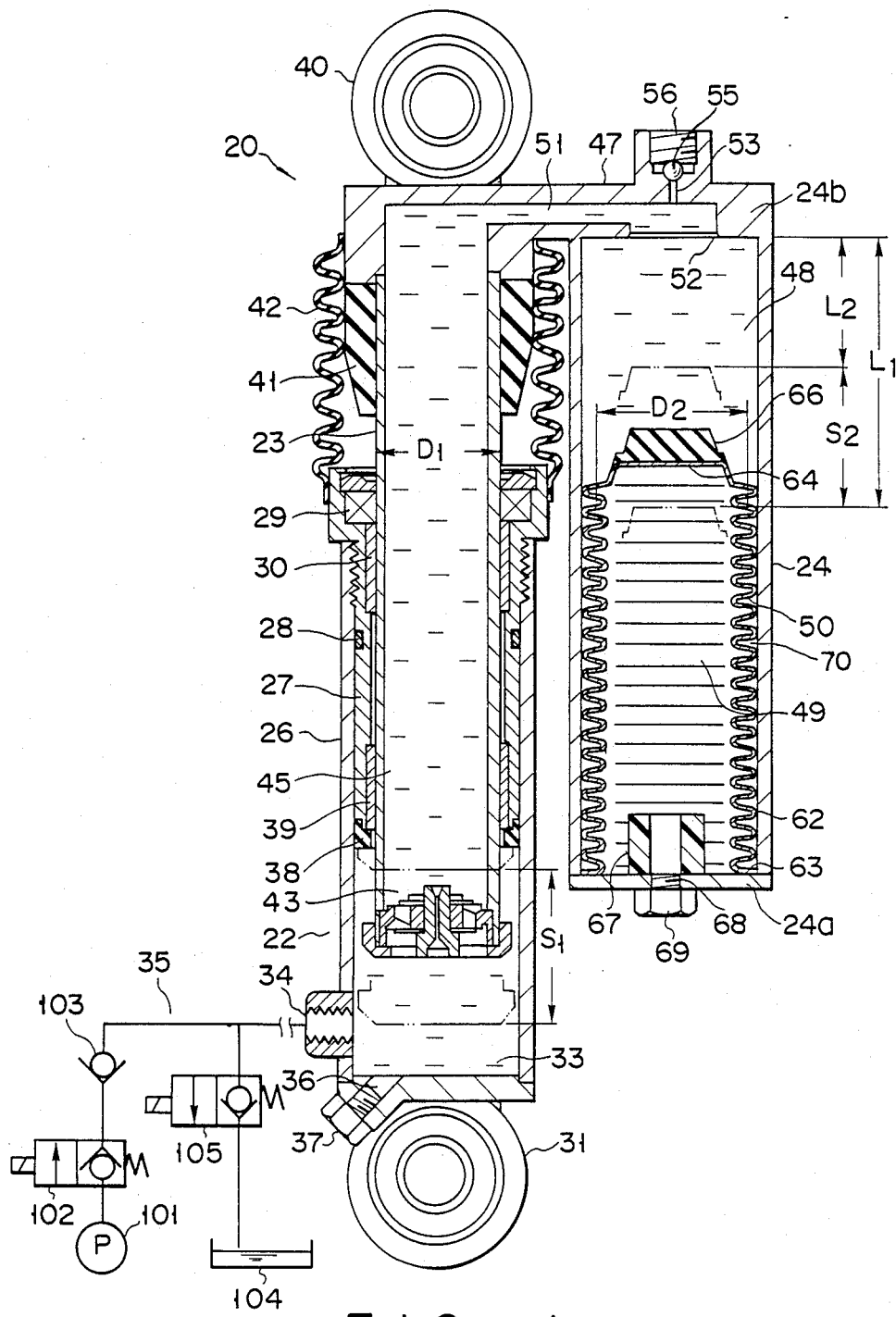
FIG. 1 is a longitudinal sectional view showing a suspension apparatus according to a first embodiment of the present invention.

FIG. 1 show suspension apparatus 20 according to a first embodiment the present invention. Suspension apparatus 20 inc first hollow cylinder 22, hollow rod 23, and hollow cylinder 24. Hollow rod 23 is inserted in first cylinder 22 so as to be movable in its axial direction. cylinder 22 is constituted by outer member 26 inner member 27 inserted/fixed inside outer member 26. Seal member 28 is arranged between members and 27. Oil seal 29 and bearing 30 are arranged at upper end portion of first cylinder 22. A lower of cylinder 22 is fixed to a member mounting an axle shown) through connecting component 31.

First liquid 33 is defined by the inner surface of cylinder 22. Liquid chamber 33 is filled with an oil as a Connecting port 34 is formed in liquid Hydraulic circuit 35 is connected to connecting port 34. Hydraulic circuit 35 includes pump 101, solenoid valve 102 arranged between pump 101 and connecting port 34, check valve 103, oil tank 104, and solenoid valve 105 arranged between oil tank 104 and connecting port 34. Oil drain hole 36 which can be sealed by plug 37 is formed in a lowermost portion of cylinder 22.

Rebound stopper 38 as a first stopper means is arranged at the lower end of inner member 27. When rod 23 moves in a direction to extend from cylinder 22, stopper 38 defines a stroke end in this direction. Bearing 39 is arranged near the lower end of inner member 27.

Component 40 for connecting rod 23 to a vehicle body is arranged on the upper end of hollow rod 23. Rubber bumper 41 as a second stopper means is arranged near the upper end of rod 23. When rod 23 moves in a direction to be pushed into cylinder 22, bumper 41 defines a stroke end in this direction. Therefore, rod 23 can be reciprocated only within the range of first stroke S1. Dust cover 42 covers a sliding surface of rod 23 with respect to cylinder 22.

Bore 45 is formed in hollow rod 23 in its axial direction. Damping force generating mechanism 43 comprising a known plate valve and an orifice is arranged midway along bore 45. Bore 45 and first liquid chamber 33 communicate with each other through damping force generating mechanism 43.

Connecting member 47 fixes second cylinder 24 to be parallel to rod 23. Metal bellows 50 is housed in second cylinder 24. Second liquid chamber 48 is defined by the outer surface of bellows 50 and the inner surface of cylinder 24. Liquid chamber 48 is also filled with the oil. Second liquid chamber 48 communicates with first liquid chamber 33 through liquid path 51 formed in connecting member 47 bore 45 and damping force generating mechanism 43.

An inert gas such as nitrogen is sealed in gas chamber 49 defined by the inner surface of bellows 50. The pressure of this gas acts in a direction to expand bellows 50. When bellows 50 is expanded, rod 23 is moved in a direction to be pushed out of cylinder 22. In other words, when rod 23 is moved within the range of stroke S1, bellows 50 is expanded/contracted with second stroke S2. Outer diameter D1 of rod 23 is generally smaller than average diameter D2 of bellows 50. Therefore, stroke S2 of bellows 50 is shorter than stroke S1 of rod 23.

The weight of the vehicle body acts in a direction to push rod 23 into cylinder 22. When a force is applied in a direction to push rod 23 into cylinder 22, rod 23 is stopped at a position where the force balances the repulsion force of the gas in gas chamber 49. Consequently, a gas sealed in gas chamber 49 must have a pressure enough to support the weight of the vehicle body. When the suspension apparatus is used in an ordinary vehicle, the pressure in gas chamber 49 when bellows 50 moves with stroke S2 ranges from about 50 kg/cm$^2$ to 250 kg/cm$^2$.

Second cylinder 24 comprises end walls 24a and 24b opposing each other. One end of liquid path 51 is open to liquid chamber 48 at one end wall 24b. Annular valve seat 52 is formed around this opening. The other end of liquid path 51 communicates with bore 45. Air release hole 53 which can be sealed by ball 55 and bolt 56 is formed in an uppermost portion of liquid path 51.

Bellows 50 comprises bellows body 62 which can be expanded/contracted in the axial direction of cylinder 24 and end plate 64 for sealing one end of bellows body 62. Bellows body 62 consists of a metal plate such as a stainless steel plate having a thickness of about 0.1 to 0.3 mm. Other end 63 of bellows body 62 is fixed to end wall 24a of cylinder 24. Valve body 66 is formed on the upper surface of end plate 64 so as to oppose valve seat 52. Valve body 66 is made of a material having rubber-like elasticity, such as an urethane elastomer and silicone resin. After this apparatus is attached to the vehicle body and is used as a suspension, even if bellows 50 is expanded up to the end of stroke S2, sufficient distance L2 is ensured between valve seat 52 and valve body 66.

Block 67 is housed in gas chamber 49. Block 67 has a proper volume for adjusting the internal volume of gas chamber 49. Block 67 is made of a material having elasticity, such as an elastomer. However, block 67 may be made of a metal. Block 67 supports end plate 64 of bellows 50 from its inner surface side if the gas in gas chamber 49 accidentally leaks therefrom. With this arrangement, even if the gas in gas chamber 49 leaks, excessive contraction of bellows 50 can be prevented. Note that a proper amount of liquid may be filled in gas chamber 49 in place of block 67. In addition, bellows 50 may be made of a synthetic resin. Gas supply port 68 formed in end wall 24a can be sealed by plug 69.

A process of supplying a gas into gas chamber 49 will be described below.

When a gas is to be supplied, oil chambers 33 and 48 and bore 45 are filled with the oil in advance. When this oil is injected, air release hole 53 is opened so as to release air in cylinders 22 and 24 through hole 53.

Figure 2:
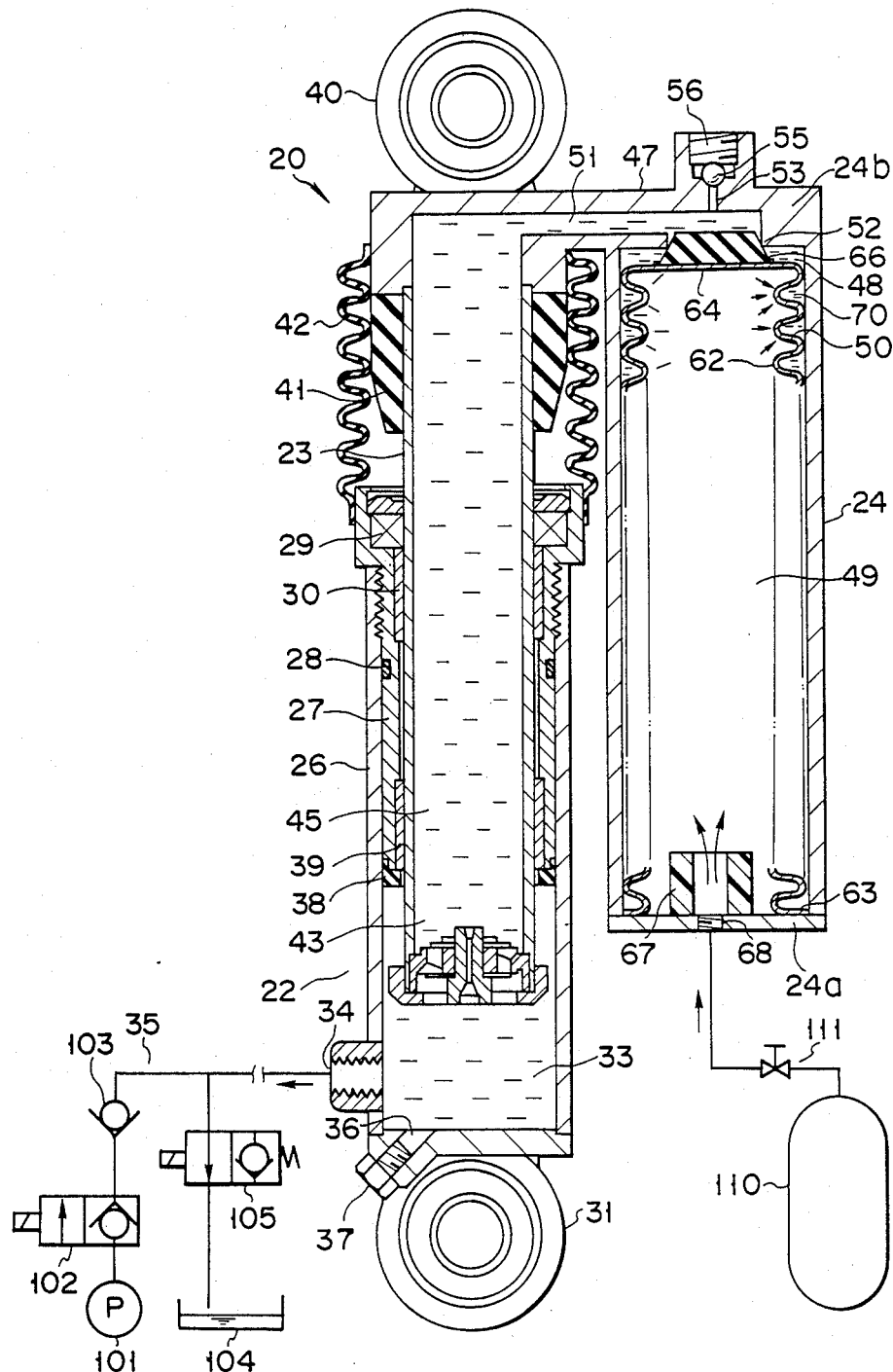
FIG. 2 is a longitudinal sectional view showing the suspension apparatus in FIG. 1 during a gas supply period.

As shown in FIG. 2, compressed-gas source 110 is connected to gas supply port 68. Valve 111 is arranged between source 110 and supply port 68. When valve 111 is opened, a gas is supplied into gas chamber 49. As the amount of gas in gas chamber 49 is increased, bellows body 62 is axially expanded. As a result, the oil in second liquid chamber 48 is discharged into first liquid chamber 33 through liquid path 51 and bore 45 of rod 23. Part of the oil in liquid chamber 33 is recovered in tank 104 through connecting port 34.

When expansion of bellows 50 exceeds stroke S2 (FIG. 1) and reaches L1, valve body 66 is brought into contact with valve seat 52. For this reason, bellows body 62 is not axially expanded any farther. In this state, the oil is entrapped in gap 70 between the inner surface of second cylinder 24 and the outer surface of bellows body 62.

Since the gas is kept supplied into gas chamber 49 after valve body 66 is brought into contact with valve seat 52, the pressure in gas chamber 49 is gradually increased. Since an oil is substantially incompressible, the entire outer surface of bellows body 62 is uniformly supported by the oil entrapped in gap 70. Therefore, even if the gas is kept supplied at a high pressure, bellows 50 will not be radially deformed. When the pressure in gas chamber 49 reaches a predetermined value, supply of the gas is stopped, and supply port 68 is sealed by plug 69.

Suspension apparatus 20 in which gas chamber 49 is filled with the gas in the above manner is assembled in the vehicle body (not shown). When rod 23 moves in a direction to protrude from cylinder 22, bellows 50 expands because the internal volume of gas chamber 49 is increased by a value corresponding to the movement of rod 23. In addition, since the oil flows into the orifice of damping force generating mechanism 43 at this time, the movement of rod 23 is restricted.

In contrast to this, when rod 23 is moved in the direction to be pushed into cylinder 22, the insertion amount of rod 23 with respect to cylinder 22 is increased. As a result, gas chamber 49 is compressed by an extent corresponding to the movement of rod 23. Cylinder 22 and rod 23 are relatively moved in the axial direction in this manner, so that suspension apparatus 20 functions as a gas spring and a shock absorber. The spring constant of suspension apparatus 20 depends on the inner volume of gas chamber 49. Therefore, in order to regulate the spring constant, the inner volume of gas chamber 49 is changed, or the initial pressure in the chamber 49 is changed. The spring constant can also be adjusted by changing the volume of block 67.

When solenoid valve 102 is opened, and the oil from pump 101 is supplied into liquid chamber 33, the amount of oil in liquid chamber 33 is increased. In this case, therefore, the protrusion amount of rod 23 with respect to cylinder 22 is increased. When solenoid valve 102 is closed while solenoid valve 105 is opened, part of the oil in liquid chamber 33 is discharged into tank 104. As a result, the protrusion amount of rod 23 is decreased.

Figure 3:
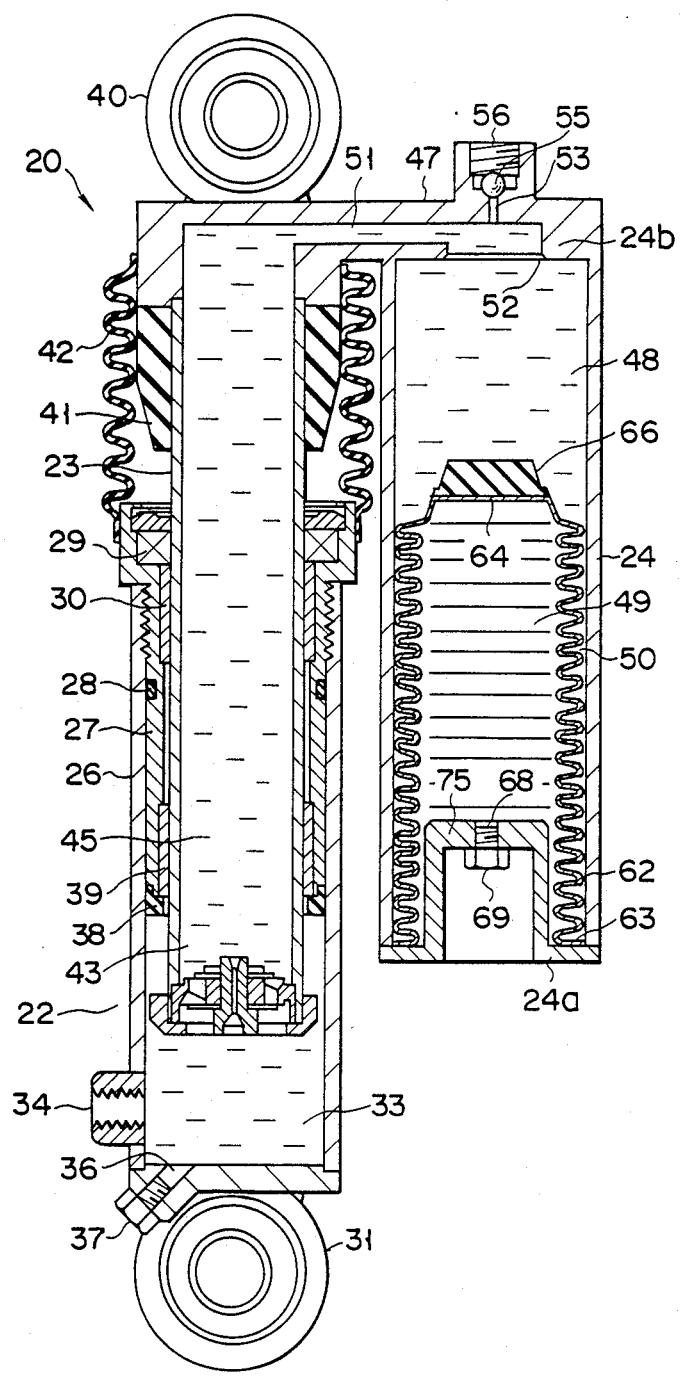
FIG. 3 is a longitudinal sectional view showing a suspension apparatus according to a second embodiment of the present invention.

FIG. 3 shows a second embodiment of the present invention. In this embodiment, projection 75 is formed in bottom wall 24a of second cylinder 24 in place of block 67 in the first embodiment. The internal volume of gas chamber 49 can be adjusted by changing the size of projection 75.

Figure 4:
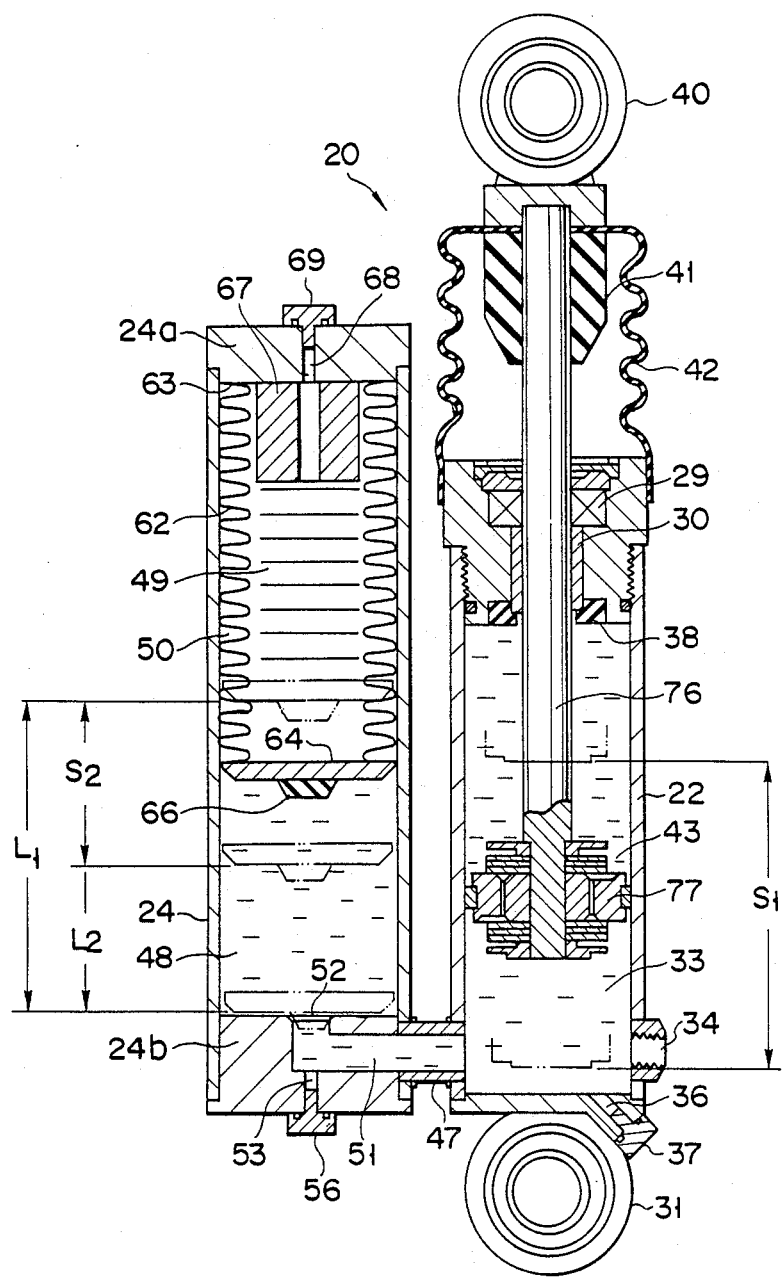
FIG. 4 is a sectional view showing a suspension apparatus according to a third embodiment of the present invention.

In a third embodiment of the present invention shown in FIG. 4, solid rod 76 is used. Piston-like portion 77 is arranged at an end portion of rod 76. Damping force generating mechanism 43 is arranged on piston-like portion 77. Suspension apparatuses 20 shown in the above-described embodiments may be used upside down.

What is claimed is:

1. An accumulator comprising:
    a first hollow cylinder whose inner surface defines a first liquid chamber which is filled with a liquid;
    connecting means arranged in said first cylinder, a liquid path communicating with said first liquid chamber being formed in said connecting means;
    a second hollow cylinder connected to said first cylinder by means of said connecting means and having first and second end walls opposing each other;
    a bellows housed in said second cylinder, said bellows including a bellows body and an end plate for sealing one end of said bellows body, the other end of said bellows body being fixed to said first end wall of said second cylinder, said bellows body freely expanding and contracting in an axial direction of said second cylinder with a stroke, a gas chamber being defined by an inner surface of said bellows body, a compressed gas being sealed in said gas chamber, a second liquid chamber being defined by an outer surface of said bellows and an inner surface of said second cylinder, and said second liquid chamber communicating with said first liquid chamber via the liquid path of said connecting means;
    a gas supply port formed in said second cylinder, said gas supply port being opened when a gas is supplied into said gas chamber, and being sealed upon completion of supply of the gas;
    a hydraulic circuit, connected to said first or second liquid chamber, for charging/discharging a liquid into/from said chambers;
    an annular valve seat formed on said second end wall of said second cylinder, said valve seat being arranged at an opening of the liquid path so as to oppose said second liquid chamber; and
    a valve body which opposes said valve seat, in such a manner that when said bellows moves within a range of the stroke, said valve body does not reach said valve seat, and when said bellows expands farther than the stroke, said valve body is brought into contact with said valve seat so as to close the liquid path of said connecting means, and the liquid is entrapped in a gap between the inner surface of said second cylinder and an outer surface of said bellows body.

2. An accumulator comprising:
    a first hollow cylinder whose inner surface defines a first liquid chamber which is filled with a liquid;
    a rod which is inserted in said first cylinder and can be reciprocated in an axial direction of said first cylinder with a first stroke;
    connecting means arranged in said first cylinder or said rod, a liquid path communicating with said first liquid chamber being formed in said connecting means;
    a second hollow cylinder connected to said first cylinder or said rod by means of said connecting means and having first and second end walls opposing each other;
    a bellows housed in said second cylinder, said bellows including a bellows body and an end plate for sealing one end of said bellows body, the other end of said bellows body being fixed to said first end wall of said second cylinder, said bellows body freely expanding and contracting in an axial direction of said second cylinder with a second stroke corresponding to the first stroke of said rod, a gas chamber being defined by an inner surface of said bellows body, a compressed gas being sealed in said gas chamber, a second liquid chamber being defined by an outer surface of said bellows and an inner surface of said second cylinder, and said second liquid chamber communicating with said first liquid chamber via the liquid path of said connecting means;

a gas supply port formed in said second cylinder, said gas supply port being opened when a gas is supplied into said gas chamber, and being sealed upon completion of supply of the gas;

a hydraulic circuit, connected to said first or second liquid chamber, for charging/discharging a liquid into/from said chambers;

an annular valve seat formed on said second end wall of said second cylinder, said valve seat being arranged at an opening of the liquid path so as to oppose said second liquid chamber; and a valve body which opposes said valve seat, in such a manner that when said bellows moves within a range of the second stroke, said valve body does not reach said valve seat, and when said bellows expands farther than the second stroke, said valve body is brought into contact with said valve seat so as to close the liquid path of said connecting means, and the liquid is entrapped in gap between the inner surface of said second cylinder and an outer surface of said bellows body.

3. An accumulator according to claim 2, wherein said rod comprises a hollow rod having a bore extending along an axial direction thereof, said hollow rod and said second cylinder are parallelly coupled to each other by said connecting means, and said bore of said rod communicates with said second cylinder through the liquid path of said connecting means.

4. An accumulator according to claim 3, wherein a damping force generating mechanism having an orifice for restricting a flow of a liquid flowing through said bore is arranged midway along said bore of said hollow rod.

5. An accumulator according to claim 2, wherein said rod comprises a solid rod, said first and second cylinders are parallelly coupled to each other by said connecting means, and said first and second liquid chambers communicate with each other through the liquid path of said connecting means.

6. An accumulator according to claim 5, wherein a piston-like portion is arranged near an end of said solid rod, and a damping force generating mechanism having an orifice is arranged on said piston-like portion.

7. An accumulator according to claim 2, wherein an air release hole is formed in an uppermost portion of the liquid path of said connecting means, and said hole is opened when a liquid is filled into said first and second liquid chambers and is sealed by a plug after the said chambers are filled with the liquid.

8. An accumulator according to claim 2, wherein said first cylinder and said rod include first stopper means for defining a stroke end in a direction that said rod is moved to protrude from said first cylinder, and second stopper means for defining a stroke end in a direction that said rod is moved to be pushed into said first cylinder.

9. An accumulator according to claim 2, wherein a member having a proper volume for adjusting an internal volume of said gas chamber is arranged in said gas chamber.

* * * * *